United States Patent [19]
Skow et al.

[11] Patent Number: 5,641,136
[45] Date of Patent: Jun. 24, 1997

[54] COMBAT AGILITY MANAGEMENT SYSTEM

[75] Inventors: Andrew Skow, Rolling Hills Estates; William M. Porada, Rancho Palos Verdes; William A. Clark, Redondo Beach, all of Calif.

[73] Assignee: Eidetics Aircraft, Inc., Lomita, Calif.

[21] Appl. No.: 363,644

[22] Filed: Dec. 22, 1994

[51] Int. Cl.$^6$ ................................................ G05D 1/00
[52] U.S. Cl. ................ 244/191; 244/75 R; 244/182; 244/195
[58] Field of Search ............... 244/191, 75 R, 244/182, 195, 181, 76 R, 76 B

[56] References Cited

U.S. PATENT DOCUMENTS

| | | | |
|---|---|---|---|
| 3,989,208 | 11/1976 | Lambregts | 244/182 |
| 4,127,249 | 11/1978 | Lambregts | 244/191 |
| 4,445,179 | 4/1984 | Michelotti | 244/182 X |
| 4,536,843 | 8/1985 | Lambregts | 244/182 X |
| 4,912,642 | 3/1990 | Larsen et al. | 244/182 X |
| 5,053,767 | 10/1991 | Zweifel et al. | 244/191 X |
| 5,079,711 | 1/1992 | Lambregts et al. | 244/181 X |

Primary Examiner—Christopher P. Ellis
Attorney, Agent, or Firm—Blakely Sokoloff Taylor & Zafman

[57] ABSTRACT

A flight control system that provides energy management for an aircraft. The flight control system includes an energy control system which generates a first error signal that is a function of an actual energy characteristic and a threshold energy characteristic. The energy characteristic may be the bleed rate of the aircraft. The error signal is converted into a control surface command signal which moves the control surface(s) of the aircraft, accordingly. The control system limits the movement of the control surface(s) so that the actual energy characteristic does not exceed the threshold energy characteristic. The energy control system can be coupled to a nominal control system which generates a second error signal that is a function of a pilot input command and a feedback signal which is indicative of the present state of the aircraft. The second error signal can also be converted to a control surface command signal which moves the control surface(s) of the aircraft. The flight control system can contain a select element which converts the first error signal into the control surface command when the second error signal is less than the first error signal, or converts the second error signal into the control surface command when the second error signal is not less than the first error signal.

29 Claims, 2 Drawing Sheets

COMBAT AGILITY MANAGEMENT SYSTEM

BACKGROUND OF THE INVENTION

1. Field of the Invention

The present invention relates to a flight control system for an aircraft.

2. Description of Related Art

Air to air combat may include a number of turns and maneuvers. There is typically a tactical advantage by having a higher velocity than the opponent. Higher velocities can be more readily attained by conserving energy during the various turns and maneuvers.

FIG. 1 shows a turn rate versus Mach number performance plot for a fighter aircraft. Starting at point A the fighter pilot may initiate a maximum performance turn by increasing the angle of attack (AOA) of the aircraft. The pilot increases the AOA until the fighter reaches the load limit of the aircraft at point B. At that point, the aircraft begins to slow down because of the additional drag created by the turn maneuver. The pilot continues an angle of attack so that the aircraft speed is at the load limit until the aircraft reaches the maximum turn rate ("corner speed") at point D. Between points D and E, and E and F the pilot maintains a maximum angle of attack to obtain the optimum turn rate.

To conserve energy it is desirable to control the fighter so that the aircraft does not reach the maximum turn rate (point D), but still has a relatively high average turn rate over time. For example, it may be desirable to have the fighter fly so that the aircraft performance curve follows the line between points C and E. During a combat engagement the pilot may not have the presence of mind, or the ability to monitor the bleed rate of the aircraft to obtain optimum energy conservation. It would therefore be desirable to have an aircraft control system that would automatically provide energy management for the plane.

SUMMARY OF THE INVENTION

The present invention is a flight control system that provides energy management for an aircraft. The flight control system includes an energy control system which generates a first error signal that is a function of an actual energy characteristic and a threshold energy characteristic. The energy characteristic may be the bleed rate of the aircraft. The error signal is converted into a control surface command signal which moves the control surface(s) of the aircraft, accordingly. The control system limits the movement of the control surface(s) so that the actual energy characteristic does not exceed the threshold energy characteristic. The energy control system can be coupled to a nominal control system which generates a second error signal that is a function of a pilot input command and a feedback signal which is indicative of the present state of the aircraft. The second error signal can also be converted to a control surface command signal which moves the control surface(s) of the aircraft. The flight control system can contain a select element which converts the first error signal into the control surface command when the second error signal is less than the first error signal, or converts the second error signal into the control surface command when the second error signal is not less than the first error signal.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 2:
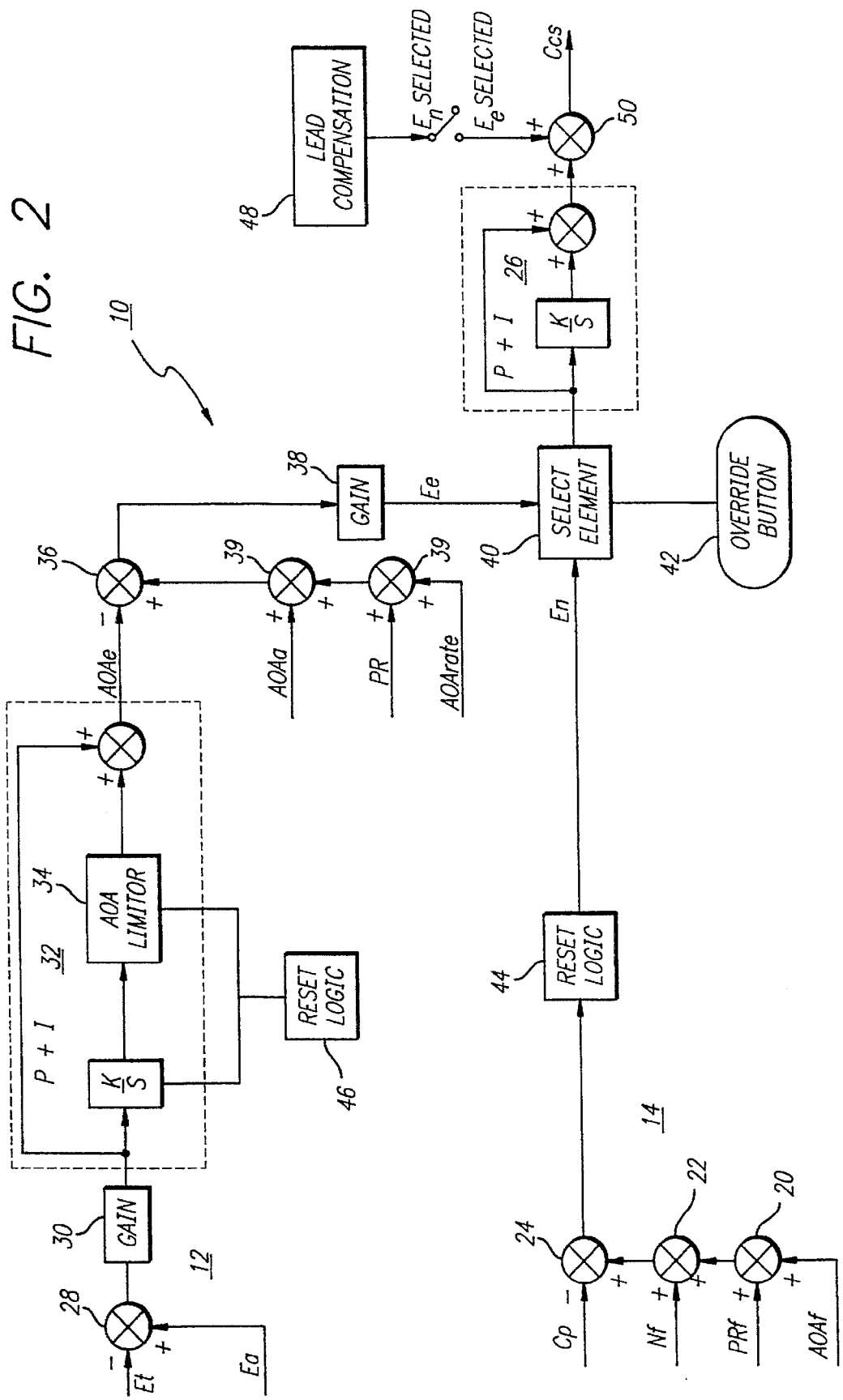
FIG. 2 is a schematic of a flight control system of the present invention.

Referring to the drawings more particularly by reference numbers, FIG. 2 shows a flight control system 10 of the present invention. The flight control system 10 typically controls the control surfaces (not shown) of an aircraft. The aircraft is typically a fighter, although it is to be understood that the control system of the present invention can be used in non-fighter aircraft. The function of the control system 10 is primarily energy conservation, although it is to be understood that other advantages and benefits may result from the operation of the system.

In the preferred embodiment, the flight control system 10 includes an energy control system 12 that is coupled to a nominal control system 14. The nominal control system 14 is an existing flight control system for the aircraft. To this end, the energy control system 12 is typically added to the existing nominal control system 14 of an aircraft.

The nominal control system 14 converts a pilot command Cp into a control surface command signal Ccs. Although other aircraft can incorporate the flight control system of the present invention, the nominal pitch control system of a F/A-18 fighter will be shown and described.

The nominal control system 14 may receive an input pitch command Cp from the pilot to change the angle of attack of the aircraft. The control system 12 also receives an angle of attack feedback signal AOAf which corresponds to the actual angle of attack of the aircraft, and a pitch rate feedback signal PRf which corresponds to the actual pitch of the aircraft. The feedback signals AOAf and PRf are summed by summing element 20. The output of summing element 20 is summed with a load factor feedback signal Nf by summing element 22. The load factor feedback signal Nf corresponds to the load limit of the aircraft. The feedback signals AOAf, PRf and Nf can be weighted according to the flight conditions of the aircraft. For example, the Nf signal can be more heavily weighted when the aircraft approaches the load limit of the plane.

The input command Cp and the output of the summing element 22 are summed by summing element 24 to create a nominal angle of attack error signal En. A proportional plus integral (P+I) control element 26 generates a control surface command Ccs signal in response to the angle of attack error signal En. The control surface command signal Ccs is used to move the control surface(s) of the aircraft. For example, the pitch command provide by the pilot may be converted into a control surface command that moves the horizontal tail of the aircraft.

Figure 1:
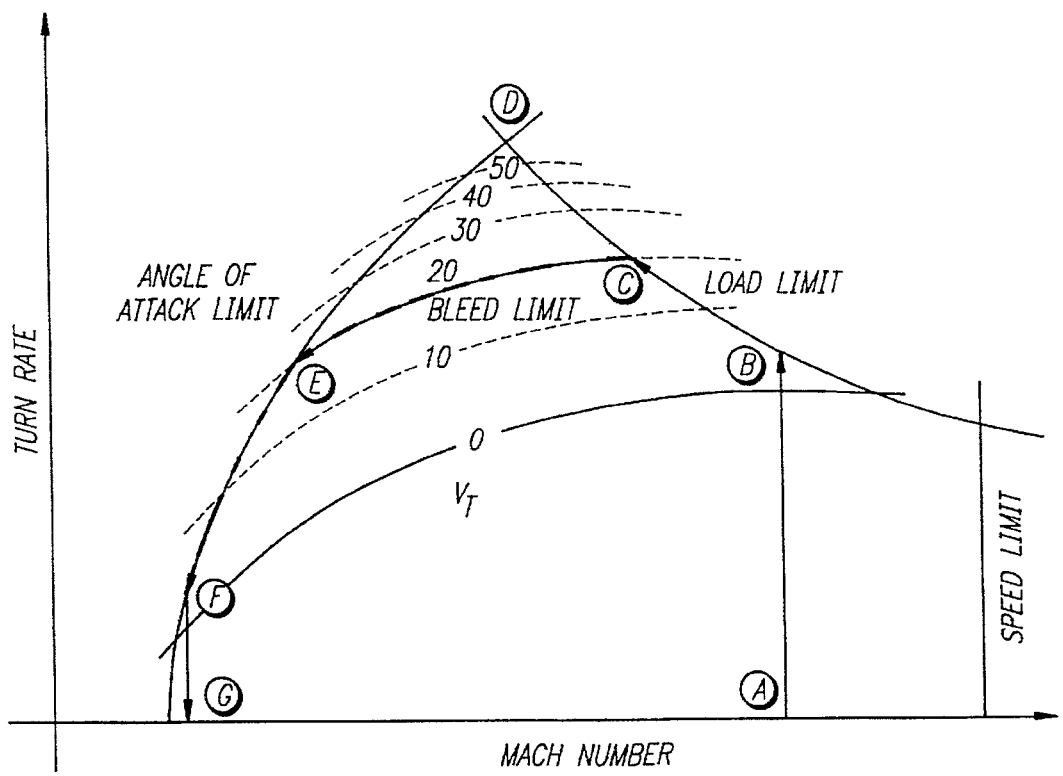
FIG. 1 is a turn rate versus Mach number performance plot for a fighter aircraft.

The energy control system 12 receives an actual energy characteristic value Ea which is summed with a threshold energy characteristic value Et by summing element 28. The energy characteristic limit can be the bleed rate of the aircraft which is typically defined as the time rate of change of the aircraft velocity (e.g. deceleration of aircraft). The actual bleed rate is the calculated bleed rate of the aircraft. The threshold bleed rate is a threshold value that is not to be exceeded by the aircraft. By way of example and referring to FIG. 1, to insure that the aircraft moves from points D to E, the bleed rate limit may be set at 20 ft/sec/sec. With this setting, the energy system 12 will insure that the aircraft will not exceed a bleed rate of 20 ft/sec/sec. The energy characteristic can also be the specific power of the aircraft, typically defined as the time rate of change of the aircraft kinetic energy and potential energy divided by the weight of the aircraft. Although bleed rate and specific power have been described as potential possible characteristics, it is to be understood that other energy related variables can be provided to the energy control system.

The output of summing element 28 is amplified by gain element 30 and provided to a proportional plus integral (P+I) control element 32. The control element 32 generates an angle of attack error signal AOAe in response to the amplified output of the summing element 30. The AOAe corresponds to the angle of attack that will provide a desired energy conservation. The control element may contain an angle of attack limiter 34 which limits the maximum angle of attack of the aircraft. By way of example, it has been found that an F/A-18 reaches maximum lift at an AOA of approximately 34°. The limiter will therefor limit the error signal so that the output of the energy control system 12 will never generate an error signal that will cause the aircraft to have an AOA greater than 34°.

The AOAe signal and an actual angle of attack AOAa signal, which corresponds to the existing angle of attack of the aircraft, are summed by summing element 36 and amplified (weighted) by gain element 38 to generate an energy angle of attack error signal Ee. The AOAa signal can be summed with a pitch rate signal PR and an angle of attack rate signal AOArate by summing elements 39 to cause a smooth approach to the AOA limit. The AOAa, PR and AOArate signals may be weighted by a gain element (not shown). Both error signals Ee and En are provided to a select element 40. The select element 40 provides the energy error signal Ee to the P&I control element 26 if the error signal En is less than the error signal Ee. If the error signal En is not less than the error signal Ee then the select element 40 will provide the nominal error signal En to the control element 26.

The system may include an override button 42 which allows the pilot to disable the energy control system 12 so that the error signal En is always provided to the control element 26, thus allowing the pilot to override the limits imposed by the energy control system 12. The system may also provide audio cues to the pilot when one of the energy control system limits has been attained or is being approached. For example, the system may provide a gradually increasing audio tone to the pilot as the aircraft approaches the bleed rate limit set by the energy control system.

When the select element 40 selects one of the error signals En or Ee, the non-selected system will typically continue to increase its error signal. When the select element 40 switches back to the other system, the system may provide a relatively large value that could cause an undesirable instantaneous change in the movement of the control surface. To prevent this event from occurring, both the nominal control system 14 and the energy control system 12 may have reset logic elements 44 and 46, respectively, that continuously reset the value of the error signal to correspond to the control surface command signal. For example, if the select element 40 selects the error signal Ee, the reset logic element 44 of the nominal control system 14 will continuously update the error signal En to correspond to the control surface command being generated from the error signal Ee. In this manner sudden changes in error signals are avoided when the select element switches from Ee to En, or En to Ee.

The system may have a lead compensation element 48 that anticipates deviations of the aircraft from the commanded angle of attack. The compensation element 48 is provided to summation element 50 when the error signal Ee has been selected. By way of example, if an aircraft is flying at the maximum angle of attack limit imposed by the energy control system (eg. 34°) and the pilot attempts to roll the plane, the pitch will typically increase due to the rolling command from the pilot. In anticipation of the pitch increase, the compensation element 48 will provide an error signal input to decrease the pitch of the aircraft. The output of the compensation element 48 may be a function of pitch rate, angle of attach, slideship angle, roll and yaw rates, mach number, dynamic pressure, time rate of the change of load factor and the angles of the plane.

In operation, the pilot provides a pitch command Cp to change the angle of attack. The pilot command Cp is converted into an error signal En by the nominal control system 14. An energy error signal Ee is also generated by the energy control system 12. The select element 40 selects one of the error signals based upon the relative values of the signals. The selected signal is converted into a control surface command signal by control element 26. If the error signal En exceeds error signal Ee, the pilot is attempting to change the AOA to exceed the desired bleed rate of the aircraft and the energy control system in essence takes control of the aircraft to prevent the plane from exceeding the prescribed bleed rate. The present invention thus provides a control system which will maintain the aircraft within a prescribed envelope to improve the energy management of the plane.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A flight control system for an aircraft which has a control surface, comprising:

an energy control system that generates a first error signal as a function of an actual energy characteristic value and a threshold energy characteristic value; and, a nominal control system which generates a second error signal as a function of a pilot command and an aircraft feedback signal, and a select element which selects said first error signal as an output signal when said second error signal is less than said first error signal, and selects said second error signal as said output signal when said second error signal is not less than said first error signal.

2. The flight control system as recited in claim 1, wherein said energy characteristics are a bleed rate of the aircraft.

3. The flight control system as recited in claim 1, wherein said energy characteristics are a time rate of change of a kinetic energy and a potential energy of the aircraft.

4. The flight control system as recited in claim 1, a control surface control system which generates a control surface command to move the control surface as a function of said output signal.

5. The flight control system as recited in claim 4, further comprising an override button which can be depressed so that said second error signal is always provided to said control surface control system.

6. The flight control system as recited in claim 1, wherein said energy control system includes a summation element that sums said actual energy characteristic value with said threshold energy characteristic value, and a proportional plus integral control element which converts the sum of said energy characteristic values into an energy angle of attack value.

7. The flight control system as recited in claim 6, wherein said energy control system includes a summation element that sums said energy angle of attack value with an actual angle of attack value of the aircraft.

8. The flight control system as recited in claim 7, wherein said energy control system includes an angle of attack limiter element which limits said energy angle of attack value to a threshold angle of attack value.

9. The flight control system as recited in claim 4, wherein said nominal control system includes a reset logic element which resets said second error signal to a value that corresponds to said first error signal when said first error signal is selected.

10. The flight control system as recited in claim 4, wherein said energy control system includes a reset logic element which resets said first error signal to a value that corresponds to said second error signal.

11. A flight control system for an aircraft which has a control surface, comprising:
energy control means for generating a first error signal as a function of an actual energy characteristic value and a threshold energy characteristic value; and,
nominal control means for generating a second error signal as a function of pilot command and an aircraft feedback signal, and selection means for selecting an output signal when said second error signal is less than said first error signal, and selecting said output signal when said second error signal is not less than said first error signal.

12. The flight control system as recited in claim 11, wherein said energy characteristics are a bleed rate of the aircraft.

13. The flight control system as recited in claim 11, wherein said energy characteristics are a time rate of change of a kinetic energy and a potential energy of the aircraft.

14. The flight control system as recited in claim 11, control surface control means for generating a control surface command to move the control surface as a function of said output signal.

15. The flight control system as recited in claim 14, further comprising an override button which can be depressed so that said second error signal is always provided to said control surface control means.

16. The flight control system as recited in claim 11, wherein said energy control means includes a summation element that sums said actual energy characteristic value with said threshold energy characteristic value, and a proportional plus integral control element which converts the sum of said energy characteristic values into an energy angle of attack value.

17. The flight control system as recited in claim 15, wherein energy control means includes a summation element that sums said energy angle of attack value with an actual angle of attack value of the aircraft.

18. The flight control system as recited in claim 17, wherein said energy control means includes an angle of attack limiter element which limits said energy angle of attack value to a threshold angle of attack value.

19. The flight control system as recited in claim 14, wherein said nominal control means includes a reset logic element which resets said second error signal to a value that corresponds to said first error signal when said first error signal is selected.

20. The flight control system as recited in claim 14, wherein said energy control means includes a reset logic element which resets said first error signal to a value that corresponds to said second error signal when said second error signal is selected.

21. A flight control system for an aircraft that has a control surface, comprising:
an energy control system that generates a first error signal as a function of an actual bleed rate of the aircraft and a threshold bleed rate for the aircraft;
a nominal control system which generates a second error signal as a function of a pilot command and an aircraft feedback signal;
a control surface control system that generates a control surface command to move the control surface as a function of one of said error signals; and,
a select element that provides said first error signal to said control surface control system when said second error signal is less than said first error signal, and provides said second error signal to said control surface control system when said second error signal is not less than said first signal.

22. The flight control system as recited in claim 21, further comprising an override button which can be depressed so that said second error signal is always provided to said control surface control system.

23. The flight control system as recited in claim 21, wherein said energy control system includes a summation element that sums said actual bleed rate with said threshold bleed rate, and a proportional plus integral control element which converts the sum of said bleed rates into an energy angle of attack value.

24. The flight control system as recited in claim 23, wherein said energy control system includes a summation element that sums said energy angle of attack value with an actual angle of attack value of the aircraft.

25. The flight control system as recited in claim 24, wherein said energy control system includes an angle of attack limiter element which limits said energy angle of attack value to a threshold angle of attack value.

26. The flight control system as recited in claim 21, wherein said nominal control system includes a reset logic element which resets said second error signal to a value that corresponds to said first error signal when said first error signal is selected.

27. The flight control system as recited in claim 21, wherein said energy control system includes a reset logic element which resets said first error signal to a value that corresponds to said second error signal when said second error signal is selected.

28. A method for controlling a control surface of an aircraft, comprising the steps of:
a) providing a threshold energy characteristic value and an actual energy characteristic value;
b) generating a first error signal which is a function of said threshold and actual energy characteristic values;
c) providing a pilot input command;
d) providing an aircraft feedback signal;
e) generating a second error signal which is a function of said pilot input command and said aircraft feedback signal;
f) selecting said first error signal if said second error signal is less than said first error signal; and,
g) selecting said second error signal if said second error signal is not less than said first error signal.

29. The method as recited in claim 28, further comprising the steps of:
h) generating a control surface command as a function of said selected error signal;
i) moving the control surface in response to said control surface command.

* * * * *

UNITED STATES PATENT AND TRADEMARK OFFICE
CERTIFICATE OF CORRECTION

PATENT NO. : 5,641,136
DATED : June 24, 1997
INVENTOR(S) : Skow et al.

It is certified that error appears in the above-identified patent and that said Letters Patent is hereby corrected as shown below:

In column 1 before the heading " BACKGROUND OF THE INVENTION ", please insert -- This invention was made with Government support under N00019-90-C-0283 awarded by the Department of the Navy. The Government has certain rights in this invention. --.

Signed and Sealed this

Sixteenth Day of June, 1998

*Attest:*

BRUCE LEHMAN

*Attesting Officer*  Commissioner of Patents and Trademarks